March 31, 1931.    H. L. SMITH    1,799,071
DYNAMO ELECTRIC MACHINE
Original Filed March 9, 1928    2 Sheets-Sheet 1
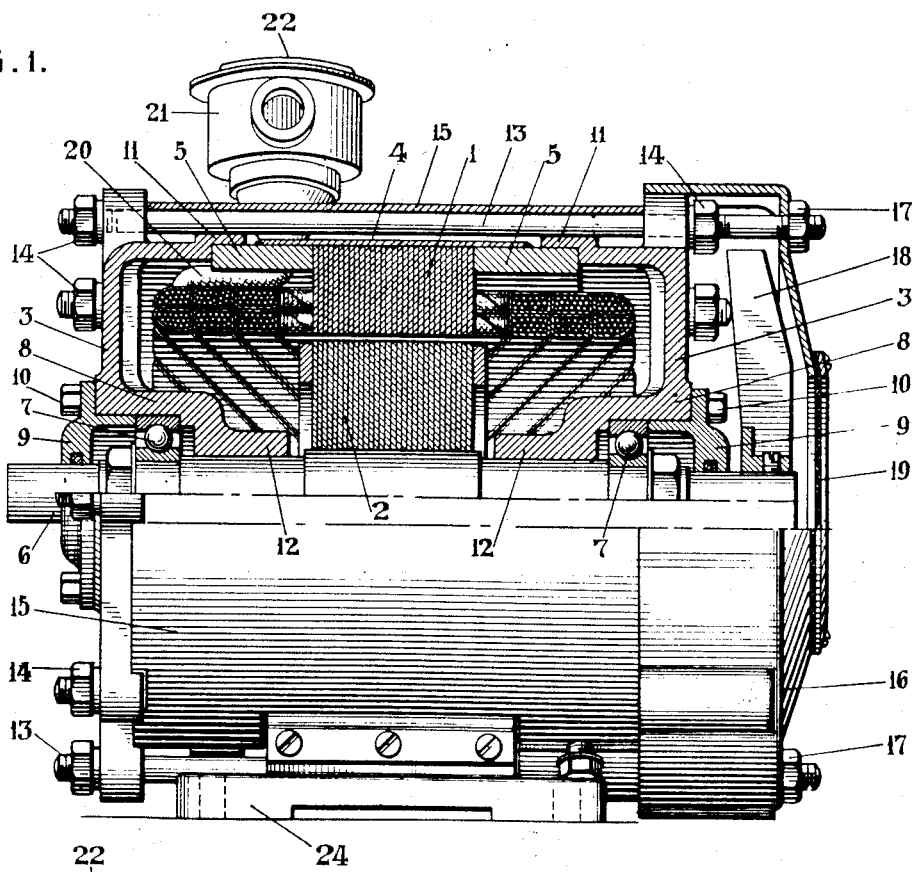
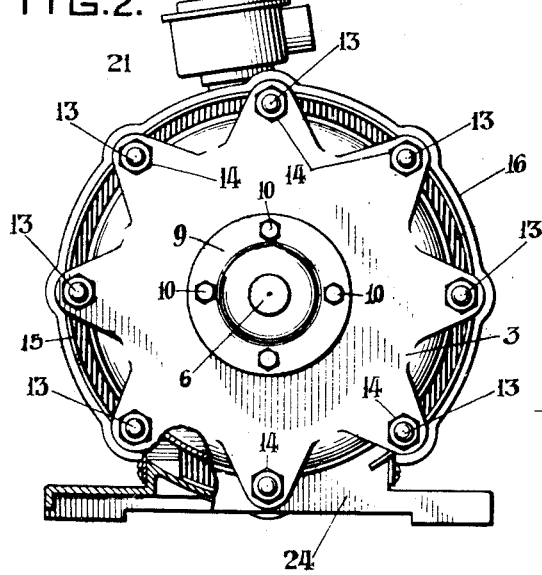
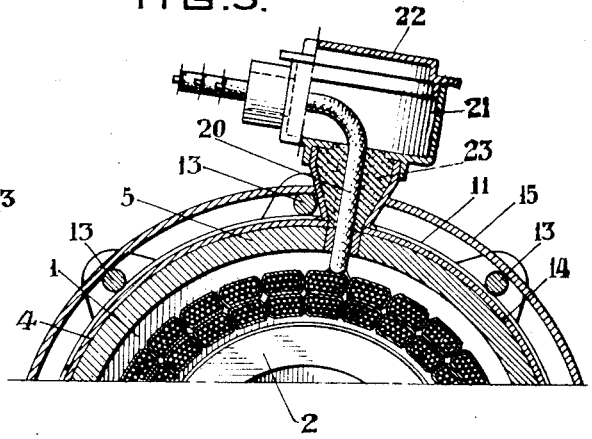
Inventor:
Harold L. Smith,
By Edwin B.␣␣␣␣␣, Jr.
Attorney.

Inventor:
Harold L. Smith,
By Edwin B. Trower Jr.
Attorney

Patented Mar. 31, 1931

1,799,071

UNITED STATES PATENT OFFICE

HAROLD L. SMITH, OF MILWAUKEE, WISCONSIN, ASSIGNOR TO THE LOUIS ALLIS COMPANY, OF MILWAUKEE, WISCONSIN, A CORPORATION OF WISCONSIN

DYNAMO-ELECTRIC MACHINE

Continuation of application Serial No. 260,330, filed March 9, 1928, and in Canada April 27, 1928. This application filed May 9, 1929. Serial No. 361,767.

The invention relates to a dynamo electric machine and applies to various types thereof.

The present application is a continuation of an original application Serial No. 260,330, filed March 9, 1928.

The dynamo electric machine to which the invention applies in particular is of the type in which the stator is provided with a laminated core arranged between its ends and with an end plate arranged upon each of its ends, and the rotor is provided with a shaft having a bearing in each end plate.

The invention has for its object to provide a dynamo electric machine which has formed within itself a closed inner casing to resist and confine a gaseous explosion within its interior and prohibit ignited or exploded gas from escaping to its exterior and which has high capacity and efficiency for a given size core and given over-all dimensions.

According to this invention as it is ordinarily practiced, the stator is provided with a laminated core having its heat dissipated to external air by direct metallic conduction, an end plate is arranged upon each end of the stator and forms therewith a closed inner casing having sufficient strength to resist and confine a gaseous explosion within its interior, each end plate has formed between itself and the stator and between itself and the shaft apart from the bearing an elongated joint having sufficient length to quench ignited or exploded gas from within the inner casing before it reaches the exterior thereof, and an open outer casing is arranged outside the inner casing to conduct external air over the core.

The dynamo electric machine which is hereinafter described and shown in the accompanying drawings to exemplify the invention is an induction motor.

The drawings illustrate a preferred motor and a modified motor, and the views therein are as follows:

Fig. 1 is a front sectional view of the preferred motor;

Fig. 2 is an end view thereof;

Fig. 3 is a transverse sectional view through the conduit box;

Figs. 1 to 3

Figure 4:
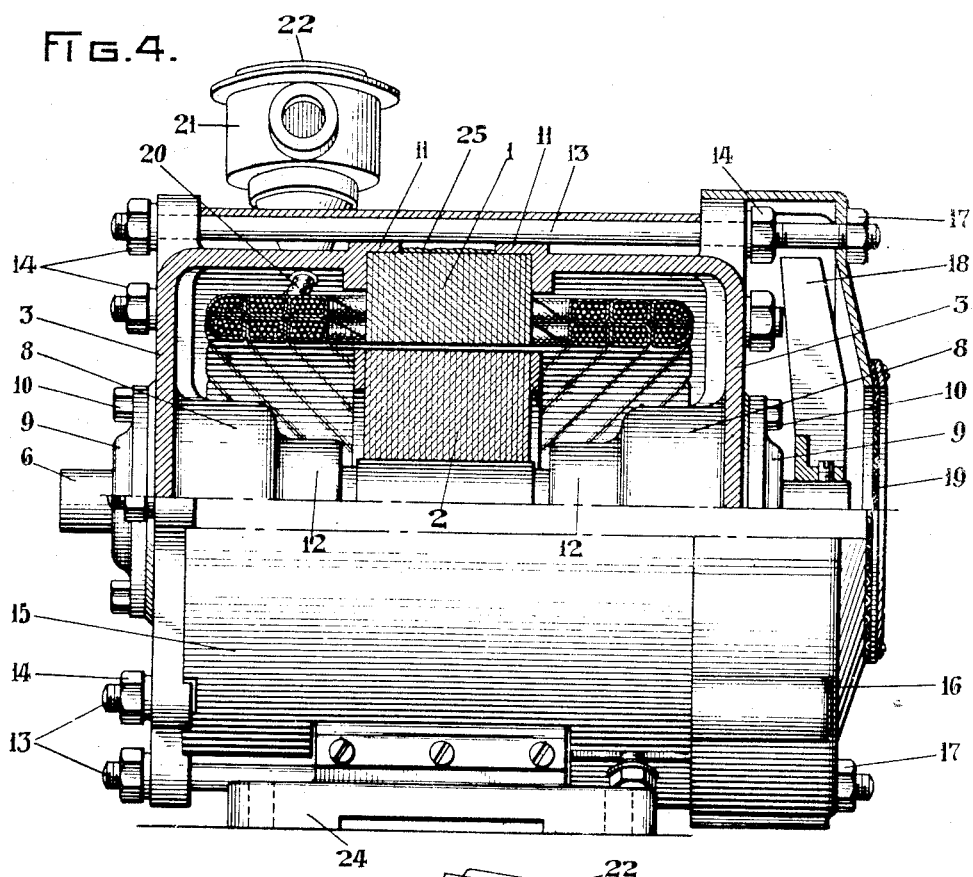
Fig. 4 is a front sectional view of the modified motor.
Figure 5:
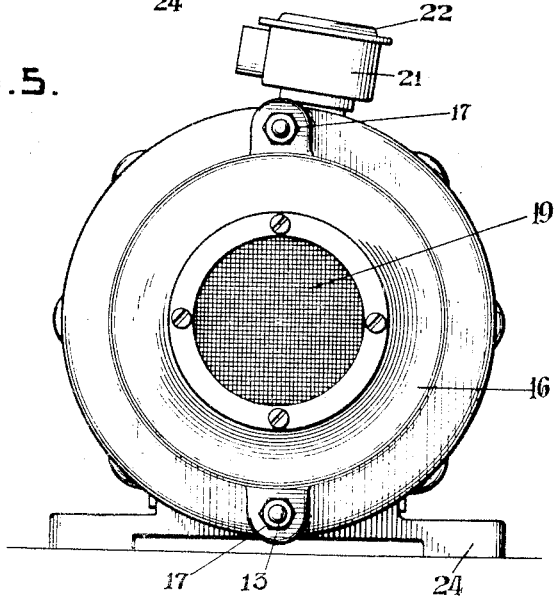
Fig. 5 is an end view thereof.

The preferred motor is provided with a stator having a laminated core 1 carrying a primary winding and a rotor having a laminated core 2 carrying a secondary winding.

The stator has arranged upon each end thereof a removable closed end plate 3 to form therewith a closed inner casing having sufficient strength to resist and confine a gaseous explosion within its interior.

The stator core has its laminations arranged within a heat conducting shell 4 or other casing exposed to external air.

The laminations are arranged in engagement with the shell and the heat is dissipated therefrom by direct metallic conduction to external air.

The laminations are bound together by an end ring 5 arranged upon each end thereof and welded or otherwise fastened to the shell.

The rotor core is arranged within the stator core and it is carried by a shaft 6 having a ball bearing 7 in each end plate.

The ball bearing is arranged within a socket 8 formed in the end plate, and it is held therein by a removable cap 9 fastened to the end plate by bolts 10.

The end plate has formed thereon a peripheral flange 11 extending over and around its adjacent end ring to form therewith an elongated joint between the end plate and the stator.

The elongated joint thus formed between the end plate and the stator has sufficient length to quench ignited or exploded gas from within the inner casing before it reaches the exterior thereof.

The end plate has formed thereon apart from the bearing for the shaft a central sleeve 12 extending over and around the shaft to form an elongated joint between the end plate and the shaft.

The elongated joint thus formed between the end plate and the shaft has sufficient length to quench ignited or exploded gas from within the inner casing before it reaches the exterior thereof.

The end plates are connected to each other by connecting bolts 13 arranged outside the inner casing and having nuts 14 upon the ends thereof.

The connecting bolts fasten the end plates upon the stator, and each end plate is held thereby in firm engagement with its adjacent end ring.

The inner casing has arranged upon the outside thereof an open outer casing 15 to conduct external air over the core, and it has arranged upon the end thereof a removable end casing 16 to conduct external air to the outer casing.

The outer casing extends over the connecting bolts between the end plates and it is carried thereby.

The end casing is carried by its adjacent end plate and it is held in place thereon by nuts 17 upon extended connecting bolts.

The outer casing has external air circulated therethrough and over the core by a fan 18 arranged in the end casing and carried by the shaft.

The end casing is provided with a central inlet opening 19 to admit external air thereto.

The primary stator winding is connected in circuit by terminal conductors 20 extending into the inner casing through a conduit box 21 having removable cover 22.

The conduit box is supported upon a conical thimble welded or otherwise fastened to an end ring.

The terminal conductors are surrounded within the thimble by an incremable substance 23 to seal the passage therefor from the inner casing to the conduit box.

The stator is carried and supported upon a base 24 by its core being mounted thereon in any suitable way.

The motor which has been explained has high capacity and efficiency for a given size core and given over-all dimensions, even though it is enclosed within a closed inner casing, as its core dissipates its heat at a high rate by direct metallic conduction to external air.

Figs. 4 and 5

The modified motor is in general the same as the preferred motor, and the same reference numerals are applied to corresponding parts thereof.

The stator core has its laminations bound together by welding 25 across the periphery or outside thereof.

The laminations are exposed to direct contact with external air, and the heat is dissipated therefrom by direct metallic conduction to external air.

The end plate bears upon the laminations instead of upon an intervening end ring, and its flange extends over the laminations to form therewith an elongated joint.

Various dynamo electric machines may be devised which embody the invention herein set forth and defined in the hereinafter claims.

The invention which has been shown and described is hereby claimed as follows:

1. A dynamo electric machine, comprising a stator provided with a laminated core having its heat dissipated to external air by direct metallic conduction, a separate closed end plate arranged upon each end of said stator and forming therewith a closed inner casing having sufficient strength to resist a gaseous explosion within its interior, means between each end plate and said stator to quench ignited gas from within said inner casing before it reaches the exterior thereof, fasteners to retain said end plates in a firm position upon said stator, a rotor arranged within said stator and having its shaft bearing in said end plates, means between each end plate and said shaft to quench ignited gas from within said inner casing before it reaches the exterior thereof, and an outer casing arranged around said inner casing to form a ventilating space for the passage of external air over said core.

2. A dynamo electric machine, comprising a stator provided with a laminated core having its heat dissipated to external air by direct metallic conduction, a separate closed end plate arranged upon each end of said stator and forming therewith a closed inner casing having sufficient strength to resist a gaseous explosion within its interior, means between each end plate and said stator to quench ignited gas from within said inner casing before it reaches the exterior thereof, bolts connecting said end plates together to retain said end plates in a firm position upon said stator, a rotor arranged within said stator and having its shaft bearing in said end plates, means between each end plate and said shaft to quench ignited gas from within said inner casing before it reaches the exterior thereof, and an outer casing arranged around said inner casing to form a ventilating space for the passage of external air over said core.

3. A dynamo electric machine, comprising a stator provided with a laminated core having its outside surface between its ends exposed to external air, a separate closed end plate arranged upon each end of said core and forming therewith a closed inner casing having sufficient strength to resist a gaseous explosion within its interior, fasteners to retain said end plates in place upon said core, a rotor arranged within said stator and having its shaft bearing in said end plates, an elongated joint formed between each end plate and said core and between each end plate and said shaft and having sufficient length to quench therein ignited gas from within said inner casing, and an outer casing arranged around said inner casing to form a ventilating space for the passage of external air over said inner casing in direct contact with said core.

4. A dynamo electric machine, comprising a stator provided with a laminated core having its outside surface between its ends exposed to external air, a separate closed end plate arranged upon each end of said core and forming therewith a closed inner casing having sufficient strength to resist a gaseous explosion within its interior, bolts connecting said end plates together to retain said end plates in a firm position upon said core, a rotor arranged within said stator and having its shaft bearing in said end plates, an elongated joint formed between each end plate and said core and between each end plate and said shaft and having sufficient length to quench therein ignited gas from within said inner casing, and an outer casing arranged around said inner casing to form a ventilating space for the passage of external air over said inner casing in direct contact with said core.

5. A dynamo electric machine, comprising a stator provided with a laminated core having its outside surface between its ends exposed to external air, a separate closed end plate arranged upon each end of said core and forming therewith a closed inner casing having sufficient strength to resist a gaseous explosion within its interior, bolts connecting said end plates together to retain said end plates in a firm position upon said core, a rotor arranged within said stator and having its shaft bearing in said end plates, an elongated joint formed between each end plate and said core and between each end plate and said shaft and having sufficient length to quench therein ignited gas from within said inner casing, an outer casing arranged around said inner casing to form a ventilating space for the passage of external air over said inner casing in direct contact with said core, and a fan arranged upon the outside of said inner casing and carried by said shaft.

6. A dynamo electric machine, comprising a stator provided with a laminated core having its outside surface between its ends exposed to external air, a separate closed end plate arranged upon each end of said core and forming therewith a closed inner casing having sufficient strength to resist a gaseous explosion within its interior, bolts connecting said end plates together to retain said end plates in a firm position upon said core, a rotor arranged within said stator and having its shaft bearing in said end plates, an elongated joint formed between each end plate and said core and between each end plate and said shaft and having sufficient length to quench therein ignited gas from within said inner casing, an outer casing arranged around said inner casing to form a ventilating space for the passage of external air over said inner casing in direct contact with said core, a fan arranged upon the outside of said inner casing, and a removable end casing arranged upon a corresponding end plate to enclose said fan and retained in place by said bolts.

7. A dynamo electric machine, comprising a stator provided with a laminated core having its heat dissipated to external air by direct metallic conduction, a separate closed end plate arranged upon each end of said core and forming therewith a closed inner casing having sufficient strength to resist a gaseous explosion within its interior, fasteners to retain said end plates in place upon said core, a rotor arranged within said stator and having its shaft bearing in said end plates, an elongated joint formed between each end plate and said core and having sufficient length to quench ignited gas from within said casing before it reaches the exterior thereof, an elongated sleeve carried by each end plate apart from the bearing for said shaft and surrounding said shaft over a sufficient length in close relation thereto to quench ignited gas from within said casing before it reaches the exterior thereof, and an outer casing arranged around said inner casing to form a ventilating space for the passage of external air over said core.

8. A dynamo electric machine, comprising a stator provided with a laminated core having its heat dissipated to external air by direct metallic conduction, a separate closed end plate arranged upon each end of said core and forming therewith a closed inner casing having sufficient strength to resist a gaseous explosion within its interior, bolts connecting said end plates together to retain said end plates in a firm position upon said core, a rotor arranged within said stator and having its shaft bearing in said end plates, an elongated joint formed between each end plate and said core and having sufficient length to quench ignited gas from within said casing before it reaches the exterior thereof, an elongated sleeve carried by each end plate apart from the bearing for said shaft and surrounding said shaft over a sufficient length in close relation thereto to quench ignited gas from within said casing before it reaches the exterior thereof, and an outer casing arranged around said inner casing to form a ventilating space for the passage of external air over said core.

9. A dynamo electric machine, comprising a stator provided with a laminated core having its heat dissipated to external air by direct metallic conduction, a separate closed end plate arranged upon each end of said core and forming therewith a closed inner casing having sufficient strength to resist a gaseous explosion within its interior, bolts connecting said end plates together to retain said end plates in a firm position upon said core, a rotor arranged within said stator and having its shaft bearing in said end plates, an elongated joint formed between each end plate and said core and having sufficient length to quench ignited gas from within said casing before it reaches the exterior thereof, an elongated sleeve carried by each end plate apart from the bearing for said shaft and surrounding said shaft over a sufficient length in close relation thereto to quench ignited gas from within said casing before it reaches the exterior thereof, an outer casing arranged around said inner casing to form a ventilating space for the passage of external air over said core, and a fan arranged upon the outside of said inner casing and carried by said shaft.

10. A dynamo electric machine, comprising a stator provided with a laminated core having its heat dissipated to external air by direct metallic conduction, a separate closed end plate arranged upon each end of said core and forming therewith a closed inner casing having sufficient strength to resist a gaseous explosion within its interior, bolts connecting said end plates together to retain said end plates in a firm position upon said core, a rotor arranged within said stator and having its shaft bearing in said end plates, an elongated joint formed between each end plate and said core and having sufficient length to quench ignited gas from within said casing before it reaches the exterior thereof, an elongated sleeve carried by each end plate apart from the bearing for said shaft and surrounding said shaft over a sufficient length in close relation thereto to quench ignited gas from within said casing before it reaches the exterior thereof, an outer casing arranged around said inner casing to form a ventilating space for the passage of external air over said core, a fan arranged upon the outside of said inner casing, and a removable end casing arranged upon a corresponding end plate to enclose said fan and retained in place by said bolts.

11. A dynamo electric machine comprising a stator provided with a laminated core having its laminations imperforate between its winding slots and its outside and bound together by a binding arranged upon its exterior in continuous engagement therewith to dissipate heat direct therefrom, a separate closed end plate arranged upon each end of said core and forming therewith a closed inner casing having sufficient strength to resist a gaseous explosion within its interior, fasteners to retain said end plates in place upon said core, a rotor arranged within said stator and having its shaft bearing in said end plates, an elongated joint formed between each end plate and said core and between each end plate and said shaft and having sufficient length to quench therein ignited gas from within said inner casing, and an outer casing arranged around said inner casing to form a ventilating space for the passage of external air over said core.

12. A dynamo electric machine comprising a stator provided with a laminated core having its laminations bound together between end rings connected by a shell upon its outside in engagement therewith to form a heat dissipating surface therefor, a separate closed end plate arranged upon each end of said core and forming therewith a closed inner casing having sufficient strength to resist a gaseous explosion within its interior, fasteners to retain said end plates in place upon said core, a rotor arranged within said stator and having its shaft bearing in said end plates, an elongated joint formed between each end plate and said core and between each end plate and said shaft and having sufficient length to quench therein ignited gas from within said inner casing, and an outer casing arranged around said inner casing to form a ventilating space for the passage of external air over said core.

13. A dynamo electric machine, comprising a stator provided with a laminated core having its heat dissipated to external air by direct metallic conduction, a closed end plate arranged upon each end of said stator and forming therewith a closed inner casing having sufficient strength to resist and confine a gaseous explosion within its interior, an elongated joint connecting each end plate with said stator and having sufficient length to quench ignited or exploded gas from within said inner casing before it reaches the exterior thereof, a rotor arranged within said stator and carried by a shaft having a bearing in each end plate, an elongated joint connecting each end plate with said shaft and having sufficient length to quench ignited or exploded gas from within said inner casing before it reaches the exterior thereof, and an outer casing arranged outside said inner casing to conduct external air over said core.

14. A dynamo electric machine, comprising a stator provided with a laminated core having its heat dissipated to external air by direct metallic conduction, a closed end plate arranged upon each end of said stator and forming therewith a closed inner casing having sufficient strength to resist and confine a gaseous explosion within its interior, an elongated joint connecting each end plate with said stator and having sufficient length to quench ignited or exploded gas from within said inner casing before it reaches the exterior thereof, a rotor arranged within said stator and carried by a shaft having a bearing in each end plate, an elongated joint connecting each end plate with said shaft apart from said bearing and having sufficient length to quench ignited or exploded gas from within said inner casing before it reaches the exterior thereof, and an outer casing arranged outside said inner casing to conduct external air over said core.

15. A dynamo electric machine, comprising a stator provided with a laminated core having its heat dissipated to external air by direct metallic conduction, a closed end plate arranged upon each end of said stator and forming therewith a closed inner casing having sufficient strength to resist and confine a gaseous explosion within its interior, bolts connecting said end plates to each other to fasten the same in place upon said stator, an elongated joint connecting each end plate with said stator and having sufficient length to quench ignited or exploded gas from within said inner casing before it reaches the exterior thereof, a rotor arranged within said stator and carried by a shaft having a bearing in each end plate, an elongated joint connecting each end plate with said shaft apart from said bearing and having sufficient length to quench ignited or exploded gas from within said inner casing before it reaches the exterior thereof, and an outer casing arranged outside said inner casing to conduct external air over said core.

16. A dynamo electric machine, comprising a stator provided with a laminated core having its heat dissipated to external air by direct metallic conduction, a closed end plate arranged upon each end of said stator and forming therewith a closed inner casing having sufficient strength to resist and confine a gaseous explosion within its interior, an elongated joint connecting each end plate with said stator and having sufficient length to quench ignited or exploded gas from within said inner casing before it reaches the exterior thereof, a rotor arranged within said stator and carried by a shaft having a bearing in each end plate, a sleeve connecting said end plate with said shaft apart from said bearing and forming an elongated joint between said end plate and said shaft having sufficient length to quench ignited or exploded gas from within said inner casing before it reaches the exterior thereof, an outer casing arranged outside said inner casing to conduct external air over said core, a fan carried by said shaft to cause external air to pass through said outer casing, and an end casing enclosing said fan.

17. A dynamo electric machine, comprising a stator provided with a laminated core having its heat dissipated to external air by direct metallic conduction, a closed end plate arranged upon each end of said stator and forming therewith a closed inner casing having sufficient strength to resist and confine a gaseous explosion within its interior, bolts connecting said end plates to each other to fasten the same in place upon said stator, an elongated joint connecting each end plate with said stator and having sufficient length to quench ignited or exploded gas from within said inner casing before it reaches the exterior thereof, a rotor arranged within said stator and carried by a shaft having a bearing in each end plate, a sleeve connecting said end plate with said shaft apart from said bearing and forming an elongated joint between said end plate and said shaft having sufficient length to quench ignited or exploded gas from within said inner casing before it reaches the exterior thereof, and an outer casing arranged outside said inner casing to conduct external air over said core.

18. A dynamo electric machine, comprising a stator provided with a laminated core having its heat dissipated to external air by direct metallic conduction, a closed end plate arranged upon said stator at the end thereof to form therewith a closed inner casing having sufficient strength to resist and confine a gaseous explosion within its interior, an elongated joint connecting said end plate with said stator and having sufficient length to quench ignited or exploded gas from within said inner casing before it reaches the exterior thereof, a rotor arranged within said stator and carried by a shaft having a bearing in said end plate, an elongated joint connecting said end plate with said shaft apart from said bearing and having sufficient length to quench ignited or exploded gas from within said inner casing before it reaches the exterior thereof, and an outer casing arranged outside said inner casing to conduct external air over said core.

19. A dynamo electric machine, comprising a stator provided with a laminated core having its heat dissipated to external air by direct metallic conduction, a closed end plate arranged upon said stator at the end thereof to form therewith a closed inner casing having sufficient strength to resist and confine a gaseous explosion within its interior, an elongated joint connecting said end plate with said stator and having sufficient length to quench ignited or exploded gas from within said inner casing before it reaches the exterior thereof, a rotor arranged within said stator and carried by a shaft having a bearing in said end plate, a sleeve connecting said end plate with said shaft apart from said bearing and forming an elongated joint between said end plate and said shaft having sufficient length to quench ignited or exploded gas from within said inner casing before it reaches the exterior thereof, and an outer casing arranged outside said inner casing to conduct external air over said core.

20. A dynamo electric machine, comprising a stator provided with a laminated core arranged within a heat conducting shell in direct engagement with its laminations, an end ring arranged upon each end of said laminations and fastened to said shell, a closed end plate arranged upon each end of said stator in engagement with its adjoining end ring and forming with said stator a closed inner casing having sufficient strength to resist and confine a gaseous explosion within its interior, an elongated joint formed between each end plate and its adjoining end ring and having sufficient length to quench ignited or exploded gas from within said inner casing before it reaches the exterior thereof, a rotor arranged within said stator and carried by a shaft having a bearing in each end plate, a sleeve connecting said end plate with said shaft apart from said bearing and forming an elongated joint between said end plate and said shaft having sufficient length to quench ignited or exploded gas from within said inner casing before it reaches the exterior thereof, and an outer casing arranged outside said inner casing to conduct external air over said core.

21. A dynamo electric machine, comprising a stator provided with a laminated core arranged within a heat conducting shell in direct engagement with its laminations, an end ring arranged upon each end of said laminations and fastened to said shell, a closed end plate arranged upon each end of said stator in engagement with its adjoining end ring and forming with said stator a closed inner casing having sufficient strength to resist and confine a gaseous explosion within its interior, bolts connecting said end plates together to fasten the same in place upon said stator, an elongated joint formed between each end plate and its adjoining end ring and having sufficient length to quench ignited or exploded gas from within said inner casing before it reaches the exterior thereof, a rotor arranged within said stator and carried by a shaft having a bearing in each end plate, a sleeve connecting said plate with said shaft apart from said bearing and forming an elongated joint between said end plate and said shaft having sufficient length to quench ignited or exploded gas from within said inner casing before it reaches the exterior thereof, and an outer casing arranged outside said inner casing to conduct external air over said core.

22. A dynamo electric machine, comprising a stator provided with a laminated core having its laminations exposed to direct contact with external air, a closed end plate arranged upon each end of said core and forming therewith a closed inner casing having sufficient strength to resist and confine a gaseous explosion within its interior, an elongated joint connecting each end plate with said core and having sufficient length to quench ignited or exploded gas from within said inner casing before it reaches the exterior thereof, a rotor arranged within said core and carried by a shaft having a bearing in each end plate, an elongated joint connecting each end plate with said shaft apart from said bearing and having sufficient length to quench ignited or exploded gas from within said inner casing before it reaches the exterior thereof, and an outer casing arranged outside said inner casing to conduct external air over said core.

23. A dynamo electric machine, comprising a stator provided with a laminated core having its laminations exposed to direct contact with external air, a closed end plate arranged upon each end of said core and forming therewith a closed inner casing having sufficient strength to resist and confine a gaseous explosion within its interior, an elongated joint connecting each end plate with said core and having sufficient length to quench ignited or exploded gas from within said inner casing before it reaches the exterior thereof, a rotor arranged within said core and carried by a shaft having a bearing in each end plate, an elongated joint connecting each end plate with said shaft apart from said bearing and having sufficient length to quench ignited or exploded gas from within said inner casing before it reaches the exterior thereof, an outer casing arranged outside said inner casing to conduct external air over said core, a fan carried by said shaft to cause external air to pass through said outer casing, and an end casing enclosing said fan.

In witness whereof, I have hereunto subscribed my name.

HAROLD L. SMITH.